(No Model.)
C. A. DANIEL.
STRIKING BAG DISK.
No. 516,719. Patented Mar. 20, 1894.
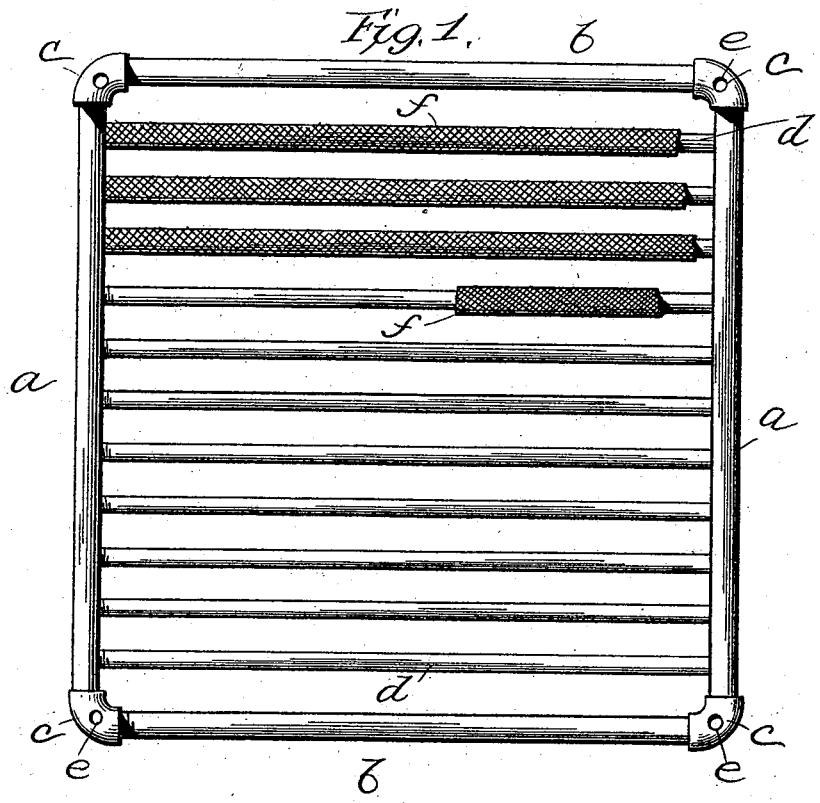
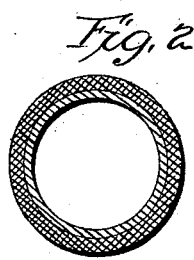
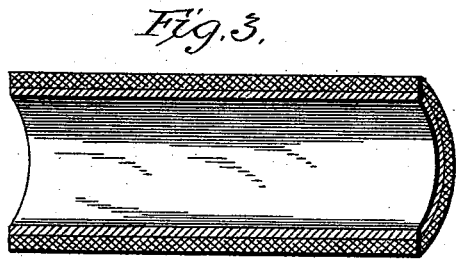
Attest
Inventor
Charles A. Daniel
by Ellis Spear
Atty

UNITED STATES PATENT OFFICE.

CHARLES ALBERT DANIEL, OF PHILADELPHIA, PENNSYLVANIA.

STRIKING-BAG DISK.

SPECIFICATION forming part of Letters Patent No. 516,719, dated March 20, 1894.

Application filed August 14, 1893. Serial No. 483,097. (No model.)

*To all whom it may concern:*

Be it known that I, CHARLES ALBERT DANIEL, a citizen of the United States of America, residing at Philadelphia, in the county of Philadelphia and State of Pennsylvania, have invented certain new and useful Improvements in Striking-Bag Disks, of which the following is a specification.

This invention is an improved platform or "disk" designed to be located above a striking bag to limit the movement of the bag and cause its quick rebound.

The object of the invention is to provide a striking bag disk of simple and durable construction and withal very rigid so that the bag on coming in contact with the disk will be caused to rebound quickly therefrom.

A further object is to provide a striking bag disk of rigid form so constructed that while the bag will be caused to rebound quickly therefrom the amount of wear will be reduced to a minimum.

A striking bag disk constructed in accordance with my invention is illustrated in the accompanying drawings in which—

Figure 1, is a plan view of the disk, showing a portion with the covering removed. Figs. 2 and 3, are details.

In making a disk in accordance with my invention I construct it wholly of iron rods or tubes which are provided with a suitable covering to reduce the wear on the bag. I find the most convenient manner of constructing the disk is to use gas pipe or pipes similar thereto, as shown in the present instance. I form the frame of four outer pipes of larger diameter than the cross pipes, these outer pipes $a$, $a$, and $b$, $b$, being connected at their ends by elbow pipes $c$, thus forming a square. Between two of the sides as $a$, $a$, extend the series of cross pipes $d$, $d$, parallel with each other and as close together as may be found desirable. To secure the ends of the cross pipes in the pipes $a$, any means may be used for the purpose as desired. A hole is made at each corner as at $e$, by means of which the disk can be suspended from the ceiling by rods or pipes which have their ends secure in these holes.

In order to reduce the wear of the bag I find it desirable to coat or cover the pipes, preferably with soft rubber, as shown at $f$, and this may be done by molding the rubber around the pipes, or the pipes may be inserted within closely fitting rubber tubes made or adapted for the purpose.

Such a disk as above described is extremely simple and durable and is very rigid, and by reason of its rigidity will cause the striking bag to rebound quickly thus increasing the usefulness of the bag for exercising purposes. The covering of rubber around the pipes not only reduces the wear of the bag to a minimum but by reason of its elasticity aids in causing the quick rebound of the bag.

I claim—

A striking bag disk comprising a rigid frame work of metal rods provided with rubber coverings, substantially as described.

In testimony whereof I affix my signature in presence of two witnesses.

CHARLES ALBERT DANIEL.

Witnesses:
 E. G. ROSENBERRY,
 H. SHELLENBERGER.